(No Model.)
A. WOODWARD.
COMBINED MILK BUCKET AND STOOL.
No. 271,291. Patented Jan. 30, 1883.
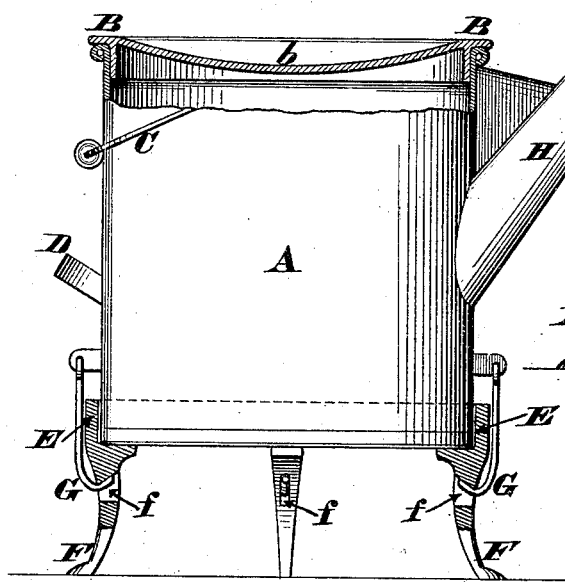
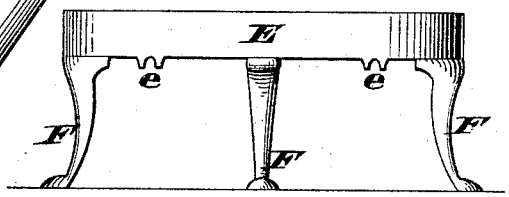
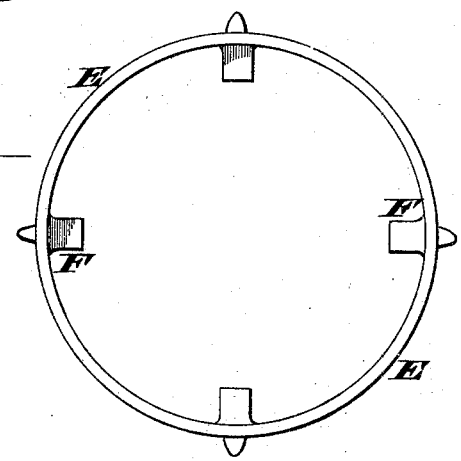
Attest.
John C. Frohliger
Louis A. Stammler
Inventor.
Abner Woodward
by James H. Layman
Attorney.

United States Patent Office.

ABNER WOODWARD, OF SHELBURNE FALLS, MASSACHUSETTS.

COMBINED MILK-BUCKET AND STOOL.

SPECIFICATION forming part of Letters Patent No. 271,291, dated January 30, 1883.

Application filed June 26, 1882. (No model.)

*To all whom it may concern:*

Be it known that I, ABNER WOODWARD, a citizen of the United States, residing at Shelburne Falls, in the county of Franklin and State of Massachusetts, have invented certain new and useful Improvements in a Combined Milk-Bucket and Stool, of which the following is a specification.

This invention relates to those utensils commonly known as "combined milk-buckets and stools," and my improvement consists in supporting the bucket on the upper ends of a series of legs or feet, which latter are cast with a detachable ring surrounding the lower portion of said bucket. Furthermore, the bucket is provided with two or more hooks capable of ready engagement with slots in the feet when it is desired to couple the latter to said bucket, as hereinafter more fully described, and pointed out in the claim.

In the annexed drawings, Figure 1 is a side elevation of a utensil embodying my improvements, the base-ring and the upper part of the bucket being sectioned. Fig. 2 is a side elevation of the ring detached from the bucket. Fig. 3 is a plan of said detached ring.

A represents a cylindrical milk-bucket or pail, having a lid, B, dished or concaved at *b*, so as to serve as a comfortable seat for the operator. C is the bail, and D the handle, of the bucket. E represents a light cast ring of such a diameter as to allow the bucket A to fit snugly therein, said ring having integral legs or feet F, slotted at *f* to permit the ready engagement of hooks G, which latter are secured to the milk-vessel. Projecting from milk-vessel A is a spout, H, within which slides a tube or pipe, I, having at its upper end a funnel, J, of such a shape as to readily receive the milk and prevent it splashing over the operator. Fitting snugly around this tube is an elastic collar, K, that maintains the former in any desired protruded or retracted position.

To use this utensil, the bucket or similar vessel A is first set in the ring E, so as to rest on the upper ends of legs F, after which act hooks G are engaged with the slots *f*. Tube I is then advanced or retracted in order that funnel J may be brought to a proper position to receive the milk, and the operator seats himself on the concave lid B *b* and proceeds with his work. As soon as the bucket A is filled it can readily be detached from the supporting-ring and placed in a water-trough, so as to cool the milk. It will thus be seen that the detachable ring and its connected feet elevate the bucket sufficiently to keep it clear of the offensive dirt and litter of the stable and barn-yard, and consequently the milk will not be so liable to become impure.

I am aware that various forms of milk-bucket holders have been patented, and therefore my claim to such a device is limited to the detachable ring having shouldered and slotted feet, for the purpose herein described.

I claim as my invention—

The ring E, in detachable combination with milk-bucket A, which latter has hooks G, that engage with the slots *f* of feet F, said feet being cast with said ring E, and having shoulders at their upper ends to support the bucket, as herein described and illustrated.

In testimony whereof I affix my signature in presence of two witnesses.

ABNER WOODWARD.

Witnesses:
SIMEON S. POWERS,
WILLIAM SHEPHERD.